B. Hinkley,
Horse Power.
Nº 487.                    Patented Nov. 25, 1837.
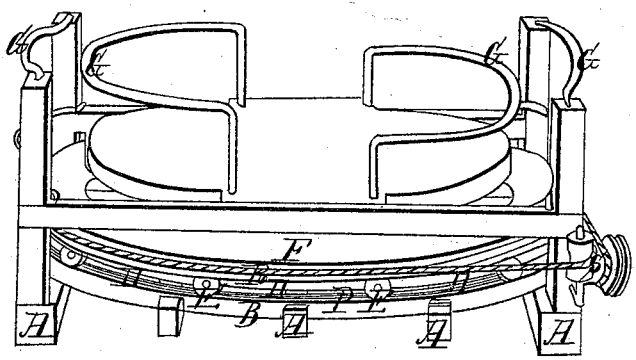

UNITED STATES PATENT OFFICE.

BENJAMIN HINKLEY, OF FAYETTE, MAINE.

HORSE-POWER FOR DRIVING MACHINERY.

Specification of Letters Patent No. 487, dated November 25, 1837.

*To all whom it may concern:*

Be it known that I, BENJAMIN HINKLEY, of Fayette, in the county of Kennebec and State of Maine, have invented a new and useful Machine for Propelling Machinery, called "Hinkley's Improved Horse-Power," which is described as follows, reference being had to the annexed drawings of the same, making part of this specification.

The construction of said horse power is as follows:

Make a frame A, of suitable timber for a foundation; place a circular rim B, stationary, ten feet or more in diameter, horizontally on said frame, said rim to be six inches wide; and two or more thick. On the upper side of said rim place a thin iron circular plate P, three inches in width; directly over the rim B place a wheel D, the diameter of which is nine or ten inches smaller than said rim B, and in the periphery of the wheel, place eight or more axles and on each of the axles, place a roller E or ball; the diameter of each roller or ball to be greater than the thickness of the rim of said wheel D; directly over this wheel place a circular revolving platform F, or horse wheel; a foot or more larger in diameter than said wheel so that a horse may travel on it near the circumference. On the under side of this platform place a thin iron plate, to correspond with the first named iron plate and perpendicularly over the same—the periphery of this platform may be grooved to receive a rope or band, or it may be connected with machinery by cogs. This wheel of rollers and circular platform are kept in their places by a loose axle or bolt, passing through their centers, into the center of the foundation. Connected with this foundation, is a suitable frame with a railing G to keep the horse or horses on the travel of the revolving platform.

To operate this power place one or more horses (suitably harnessed for work) on the top of the circular revolving platform which bears on the rollers supported by the rim of the foundation; a rope or band R being passed around said platform in the groove in the periphery thereof and around a pulley S fixed at one side or corner of the frame. A band or rope passed around this pulley may be conveyed to any machinery to be propelled.

What I, the said BENJAMIN HINKLEY, claim as my invention, and which I desire to secure by Letters Patent, is—

The wheel of truck rollers in combination with the circular revolving platform or horse wheel as before described.

BENJAMIN HINKLEY.

Witnesses:
JAMES S. LIBBY,
SWANTON WHITMORE.